United States Patent [19]
Iseli et al.

[11] Patent Number: 5,602,435
[45] Date of Patent: Feb. 11, 1997

[54] GAS-COOLED ELECTRICAL MACHINE

[75] Inventors: Markus Iseli, Mülligen, Switzerland; Lothar Koppetsch, Mannheim Vogelstrang, Germany; Hans Zimmermann, Mönchaltorf, Switzerland

[73] Assignee: ABB Management AG, Baden, Switzerland

[21] Appl. No.: 291,829

[22] Filed: Aug. 17, 1994

[30] Foreign Application Priority Data

Aug. 17, 1993 [CH] Switzerland .................. 02449/93

[51] Int. Cl.$^6$ .................. H02K 9/00; H02K 9/06; H02K 1/32
[52] U.S. Cl. .................. 310/55; 310/59; 310/61
[58] Field of Search .................. 310/53, 55, 56, 310/58, 59, 60 A, 61, 62; 137/625.28; 62/406; 376/370

[56] References Cited

U.S. PATENT DOCUMENTS

| | | | |
|---|---|---|---|
| 2,470,488 | 5/1949 | Hornerkamp et al. | 98/40 |
| 4,876,470 | 10/1989 | Geller | 310/59 |
| 5,218,998 | 6/1993 | Bakken et al. | 137/625.28 |

FOREIGN PATENT DOCUMENTS

| | | | |
|---|---|---|---|
| 0279064 | 8/1988 | European Pat. Off. . | |
| 720154 | 4/1942 | Germany . | |
| 2724420 | 12/1977 | Germany . | |
| 0138947 | 5/1989 | Japan | 310/59 |

Primary Examiner—Thomas M. Dougherty
Assistant Examiner—Jonathan Link
Attorney, Agent, or Firm—Oblon, Spivak, McClelland, Maier & Neustadt, P.C.

[57] ABSTRACT

In the case of a gas-cooled electrical machine, the effective flow cross-section of the connection from the outer hot-gas chambers to the cooler is provided with an adjustable restrictor device (29, 31; 32, 33). In this way, the splitting of the various cooling-air flows within the machine can be influenced, without intervention in the actual machine, such that equalization of the temperature level in the machine longitudinal direction is achieved.

5 Claims, 3 Drawing Sheets

GAS-COOLED ELECTRICAL MACHINE

BACKGROUND OF THE INVENTION

1. Field of the Invention

The invention relates to an electrical machine having a housing, having a stator which is arranged in this housing and has stator winding conductors which are arranged in slots on the internal circumference and are cooled indirectly, and having a rotor, the laminated core of the stator being constructed from individual laminated core elements which are separated from one another by spacer webs, and the intermediate spaces between two successive laminated core elements forming radially running cooling slits, and the cooling slits connecting annular air gap spaces on the internal circumference of the laminated stator core to chamber spaces which are located between the external circumference of the laminated stator core and the housing, which chambers comprise cold-gas chambers which can be acted on by cold cooling gas, and hot-gas chambers into which heated cooling gas flows, directed radially outwards from said cooling slits, which hot-gas chambers are connected to coolers, and cooling-gas conveying means and cooling-gas guidance devices being provided at both machine ends, which means and devices supply the cooled gas to the cold-gas chambers as cold gas and suck the heated cooling gas out of the hot-gas chambers again.

A gas-cooled electrical machine having these features is disclosed, for example, in "Brown Boveri Technik" [Brown Boveri Technology], March/1986, pages 133–138, especially FIG. 3 on page 135.

2. Discussion of Background

The principle of so-called indirect cooling is that the losses which are produced in the stator winding bars are to be passed to the cooling medium (hydrogen or air). In this case, the main heat flow takes place from the bar copper via the insulation into the tooth region of the laminated stator core. From the stator teeth, heat is passed to the cooling medium.

The limits of heating are in this case predetermined by the temperature sensitivity of the insulation and, furthermore, by corresponding maximum temperatures which are defined in Standards by different insulation classes (ANSI, IEC).

As a consequence of the relatively large temperature difference between the stator copper embedded in the insulation and the outer layer of insulation, the maximum power of an indirectly gas-cooled turbogenerator using the classic cooling principle is limited.

There has thus been no absence of proposals to improve the cooling, these efforts concentrating mainly on intensifying the cooling in the central machinery region.

Thus, EP-B-0 279 064 describes a gas-cooled electrical machine in which the hot-gas chambers in the central region of the machine are connected via separate lines, bypassing the end warm-gas chambers, directly to the coolers. This prevents the heated cooling gas from the central hot-gas chambers mixing with that from the end hot-gas chambers, and it is possible to split the volume flows through the individual cooling slits and the air gap and chamber spaces allocated to them such that virtually complete leveling of the temperature profile in the machine longitudinal direction results.

This measure has been best proven in the case of new designs. However, it can be carried out only at considerable cost in the case of machines which are already in operation.

SUMMARY OF THE INVENTION

Accordingly, one object of the invention is to provide a novel gas-cooled electrical machine of the generic type mentioned initially which makes it possible to achieve substantial uniformity of the cooling effect without any structural intervention in the actual machine.

This object is achieved in the case of a gas-cooled electrical machine of the generic type mentioned initially in that, according to the invention, restrictor devices are arranged in the outlet cross-section of the end hot-gas chambers, between said chambers and the cooler.

In this way, the cooling air flow of the machine can be split virtually as desired between the various chambers and it is thus possible to achieve a high level of uniformity of the machine temperature in the machine longitudinal direction.

The restrictor devices preferably comprise metal plates which cover the entire cross-section and are provided with a multiplicity of perforations. In this case, according to a particularly advantageous development, a perforated plate which rests against the metal plate and is likewise provided with perforations is used to adjust the effective cross-section. Fine adjustment of the effective cross-section can be achieved by displacing the two plates relative to one another.

The invention is particularly suitable for subsequent tuning of the cooling of already designed machines, since there is no need for intervention in the machine itself. In contrast, sufficient space as well as freedom of movement exist for assembly personnel to be able to install and adjust the restrictor devices in the air guides from the hot-gas chambers to the coolers, which are normally arranged in the foundation pit underneath the machine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
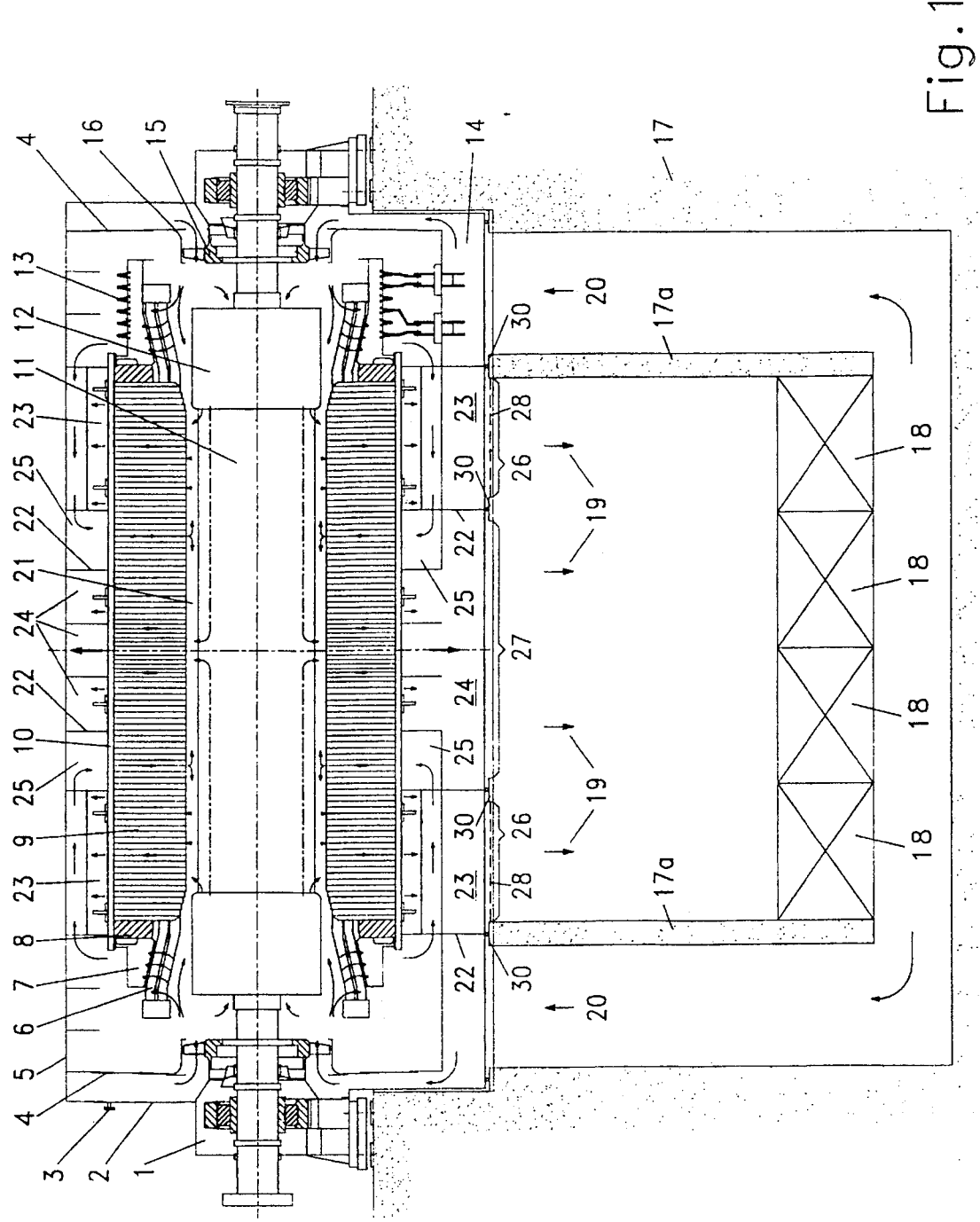
FIG. 1 shows a simplified longitudinal section of an air-cooled generator of a known type with an open cooling circuit, having restrictor devices at the outlet of the end hot-gas chambers.

Referring now to the drawings, wherein like reference numerals designate identical or corresponding parts throughout the several views, in FIG. 1, 1 designates a pedestal bearing, 2 an outer shell, 4 an inner shell and 5 a machine housing. The winding overhang 6 is supported on supporting plates 7 on a stator end plate 8. Radial ventilation slits are provided between the individual laminated core elements in the laminated stator core 9. Tie rods 10 compress the laminated stator core together with stator end plates 8. The rotor 11 has rotor caps 12 at both ends. The winding connections in the winding overhang space are designated by 13, the phase terminals and star-point terminals being designated by 14. An axial fan 15 is arranged at each of the two machine ends. The radially inner end of the inner shell 4 is constructed as an air guidance ring 16. Coolers 18 are provided in a foundation pit 17 underneath the machine. The hot air upstream of the coolers 18 is designated by arrows 19, and the cold air downstream of the coolers by arrows 20. Other arrows (which are not marked in more detail) illustrate the various cooling-air flows in the machine interior. It is intended to consider only one machine half in the following text, since—with respect to cooling—the machine is of symmetrical construction.

Cold air passes from the coolers 18 and the space between the outer shell 2 and the inner shell 4 to the fan 15. The cooling-air flow then branches. A first flow element flows through the rotor winding overhang under the rotor cap 12, a second flows into the machine air gap 21, a third cooling-air flow passes through the winding overhang space into the machine back, that is to say the space between the machine housing 5 and the laminated stator core 9.

In the machine back, cold-gas and hot-gas chambers are formed by housing ribs 22 and radial and axial separating walls. In the example, a hot-gas chamber 23 at each of the two machine ends and a hot-gas chamber 24 in the machine center, as well as a cold-gas chamber 25 in each case between the chambers 23 and 24. The said third cooling air flow flows into said cold-gas chamber 25 from the fan 15, is forced through the ventilating slits between the laminated core elements of the laminated stator core 9, and passes into said hot-gas chambers 23 and 24. The hot cooling gas passes from the hot-gas chambers 23 and 24 via large-area perforations 26 and 27 respectively to the underneath of the machine housing 5 in the foundation pit, and there to the coolers 18.

To this extent, the construction and cooling air supply corresponds to the machine which is known from the locally cited "Brown Boveri Technik" [Brown Boveri Technology]. Although the different flow resistances were taken into account in the arrangement and splitting of the air flows which enter the various chambers and emerge from them, when designing the machine, it may, however be found during subsequent operation that the cooling effect in the machine center is less effective than at the machine ends. Subsequent matching by installation and/or conversion of the various guidance and separating devices in the machine back is in this case possible only to a limited extent, if at all. This is now the reason for the invention.

In this case, the invention is based on the idea of influencing the splitting of the individual volume flows through the cold-gas and hot-gas chambers at the outlet from the machine, en route to the coolers 18, rather than within the machine housing. For this purpose, restrictor devices 28 (symbolized by dashed lines in FIG. 1) are provided in the perforations 26 which are allocated to the two hot-gas chambers 23 at the ends, which restrictor devices 28 narrow the flow cross-section, preferably adjustably, from the hot-gas chambers 23 to the coolers 18.

Figure 2:
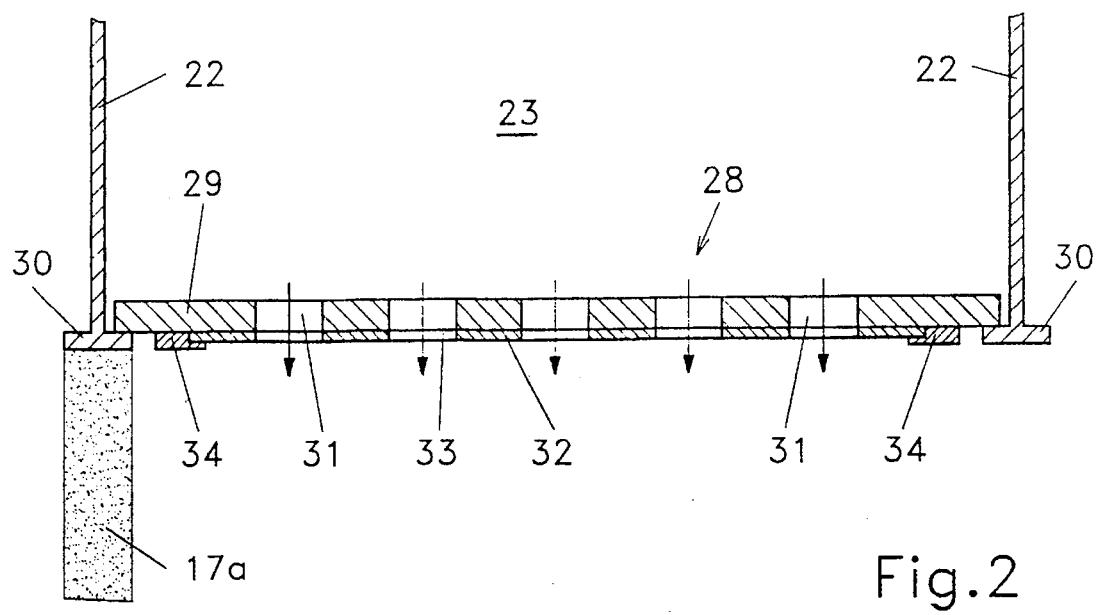
FIG. 2 shows an enlarged detail from FIG. 1, which illustrates the position and construction of the restrictor devices.

FIG. 2, which shows an enlarged detail from FIG. 1, illustrates the position and construction of these restrictor devices. Each restrictor device 28 comprises a single-piece or multipiece metal plate 29 which is mounted on a frame 30. This frame 30 is part of the machine housing and rests on one side against a base 17a of the foundation 17.

Perforations 31 are provided in a regularly distributed manner in the metal plate 29. A second perforated plate 32, which can be displaced horizontally with respect to the metal plate 29, is mounted from underneath on the bottom of the metal plate 29 and is likewise provided with perforations 33. The shape and distribution of these perforations 33 correspond to the perforations 31 in the metal plate 29. Lateral guide strips 34, which are mounted on the bottom of the metal plate 29, are used as assembly aids.

Figure 3:
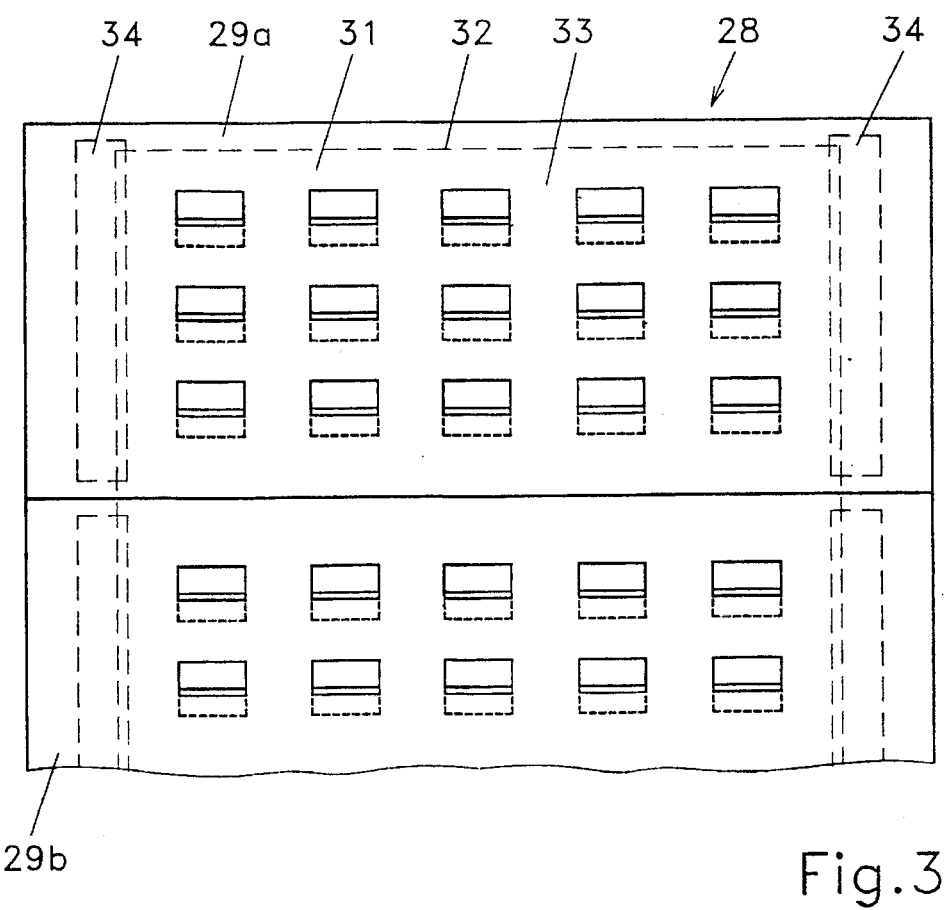
FIG. 3 shows a plan view of a restrictor device having an adjustable cross-section.

The metal plate 29 is preferably of multipiece design (parts 29a and 29b in FIG. 3) in order that it can easily be fitted into the hot-gas chamber 23 from underneath. In contrast, the perforated plate 32 may be designed integrally. As can immediately be seen from the plan view of the restrictor device according to FIG. 3, the effective cross-section of the perforations 31 in the metal plate 29 can be varied between well-defined limits by displacing the perforated plate 32 with respect to the metal plate 29 in the direction of the guide rails 34, and the effective cross-section at the outlet of the two outer hot-gas chambers 23 towards the coolers 18 can thus also be varied within predetermined values.

The following values, which have been obtained from practice, are intended to illustrate how the restrictor device can contribute, in an actual machine, to making the cooling uniform in the machine longitudinal direction:

Measurements have shown that approximately two-thirds of the stator cooling air quantity flows into the end hot-gas chambers 23, and only one-third into the central hot-gas chamber 24. As a consequence of this, the central section of the machine is heated to an unacceptable level. Estimates supported by calculations and measurements on the actual machine in operation showed that approximately 60 to 80% of the total cooling air quantity must be supplied through the central machine section (hot-gas chamber 24) in order to achieve an approximately constant temperature in the machine longitudinal direction. For this purpose, the cross-section through which the flow passed in the two end hot-gas chambers 23 had to be reduced from approximately 3 m$^2$ in each case to values between 0.1 and 0.2 m$^2$ in order to achieve this splitting of the quantity of air. It was possible to achieve the stated object directly by installing one metal plate 29, having perforations 31, in each of the two end hot-gas chambers 23, having an overall flow area of 0.2 m$^2$ and a correspondingly designed perforated plate 32. Surprisingly, the noise level of the machine increased only insignificantly as a result of the constriction of the flow cross-section in the hot-gas chambers, which is a result of the fact that the flow rates prevailing here are comparatively low.

Figure 4:
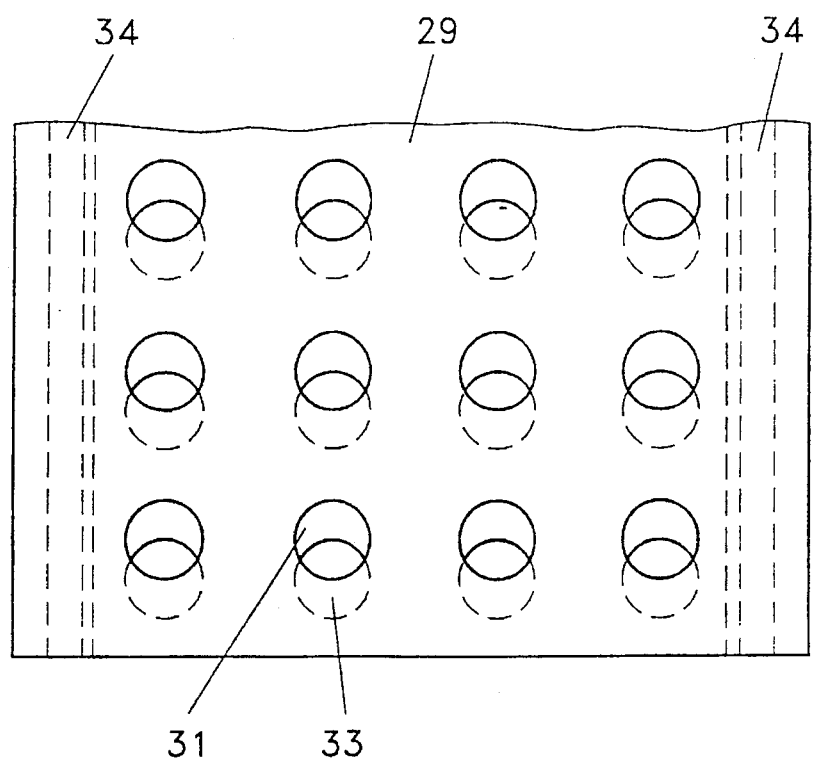
FIG. 4 shows an alternative embodiment of a restrictor device having circular perforations.
Figure 5:
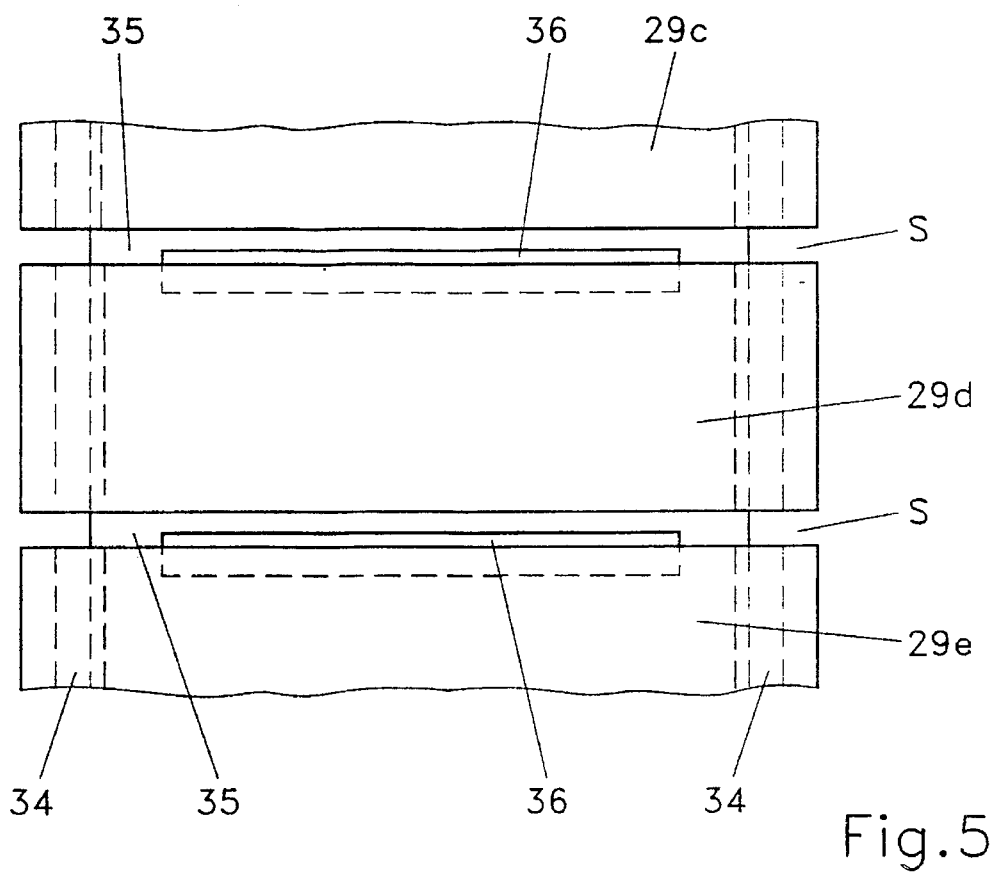
FIG. 5 shows a further variant of a restrictor device, comprising metal plates which are spaced apart from one another, and an associated slitted plate.

Perforations 31, 33 having different cross-sections, for example circular as is illustrated in FIG. 4, can also be provided instead of perforations 31, 33 having a rectangular cross-section. In addition, the perforations need not necessarily be distributed over the entire area of the metal plate 29 but can, for example, be concentrated in the central region. A plurality of metal plates, which each leave a gap free between them, can also be used as the restrictor device, instead of one or more metal plates 29 or 29a, 29b which rest closely against one another and are provided with perforations. Such a solution can be implemented in combination with a modified perforated plate, as can be seen in FIG. 5.

The metal plate consists of a plurality of parts 29c, 29d and 29e, which are spaced apart from one another by a gap S. A slitted plate 35, which has slits 36 which run parallel to the gap edges, is used instead of the perforated plate 33.

Furthermore, a metal plate which is provided with perforations and an associated perforated plate or slitted plate are unnecessary. Once the optimum cross-sections are in fact determined by trials, then a correspondingly designed metal plate or correspondingly spaced-apart plate elements having a total flow area of the same size can also be installed.

The invention has been explained in the above text with reference to an air-cooled machine having three hot-gas chambers and two cold-gas chambers. The invention can, of course, also be implemented in the case of machines having more than three hot-gas chambers and more than two cold-gas chambers. Restrictor devices of the type described would then possibly have to be installed not only in the outer hot-gas chambers but also in the other hot-gas chambers which are located between the outer hot-gas chambers and the central hot-gas chamber.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electrical machine comprising:

a foundation having a foundation pit with coolers therein;

a housing mounted on said foundation;

a rotor in said housing;

a stator in said housing, said stator having a laminated stator core and winding conductors arranged in slots on an internal circumference of the laminated stator core, the laminated stator core comprising individual laminated core elements separated from one another by spacer webs to form radial cooling slits;

cold gas chambers positioned in said housing at an external circumference of said laminated stator core;

hot gas chambers positioned in said housing between an external circumference of said laminated stator core and said housing for receiving hot gas from said radial cooling slits;

perforations formed in at least one metal plate in said housing, and located between said stator and said coolers, for permitting the hot gas in said hot gas chambers to flow to said coolers in said foundation pit so as to be cooled;

means for circulating the cooled gas in said foundation pit to said cold gas chambers; and at least one restrictor device at said perforations for restricting and controlling the flow of hot gas from said hot gas chambers to said coolers, wherein said restrictor device comprises a perforated plate movable relative to said at least one metal plate, and wherein at least the at least one metal plate comprises a plurality of plate elements in order to simplify assembly/disassembly.

2. An electrical machine comprising:

a foundation having a foundation pit with coolers therein;

a housing mounted on said foundation;

a rotor in said housing;

a stator in said housing, said stator having a laminated stator core and winding conductors arranged in slots on an internal circumference of the laminated stator core, the laminated stator core comprising individual laminated core elements separated from one another by spacer webs to form radial cooling slits;

cold gas chambers positioned in said housing at an external circumference of said laminated stator core;

hot gas chambers positioned in said housing between an external circumference of said laminated stator core and said housing for receiving hot gas from said radial cooling slits;

perforations formed in at least one metal plate in said housing, and located between said stator and said coolers, for permitting the hot gas in said hot gas chambers to flow to said coolers in said foundation pit so as to be cooled;

means for circulating the cooled gas in said foundation pit to said cold gas chambers; and at least one restrictor device at said perforations for restricting and controlling the flow of hot gas from said hot gas chambers to said coolers, wherein the at least one metal plate comprises a plurality of plate elements which are spaced apart from one another and leave a gap free between them.

3. The machine as claimed in claim 2, wherein at least the metal plate is divided into a plurality of plate elements in order to simplify assembly/disassembly.

4. The machine as claimed in claim 2, wherein said restrictor device comprises a slitted plate whose slits are arranged and distributed in such a manner that a predetermined effective cross-sectional constriction can be achieved by displacing the slitted plate relative to the plate elements.

5. An electrical machine comprising:

a foundation having a foundation pit with coolers therein;

a housing mounted on said foundation;

a rotor in said housing;

a stator in said housing, said stator having a laminated stator core and winding conductors arranged in slots on an internal circumference of the laminated stator core, the laminated stator core comprising individual laminated core elements separated from one another by spacer webs to form radial cooling slits;

cold gas chambers positioned in said housing at an external circumference of said laminated stator core;

hot gas chambers positioned in said housing between an external circumference of said laminated stator core and said housing for receiving hot gas from said radial cooling slits;

perforations formed in at least one metal plate in said housing, and located between said stator and said coolers, for permitting the hot gas in said hot gas chambers to flow to said coolers in said foundation pit so as to be cooled;

means for circulating the cooled gas in said foundation pit to said cold gas chambers; and at least one restrictor device at said perforations for restricting and controlling the flow of hot gas from said hot gas chambers to said coolers, wherein said restrictor device comprises a perforated plate movable relative to said at least one metal plate, and wherein the at least one metal plate comprises a plurality of plate elements which are spaced apart from one another and leave a gap free between them.

* * * * *